UNITED STATES PATENT OFFICE.

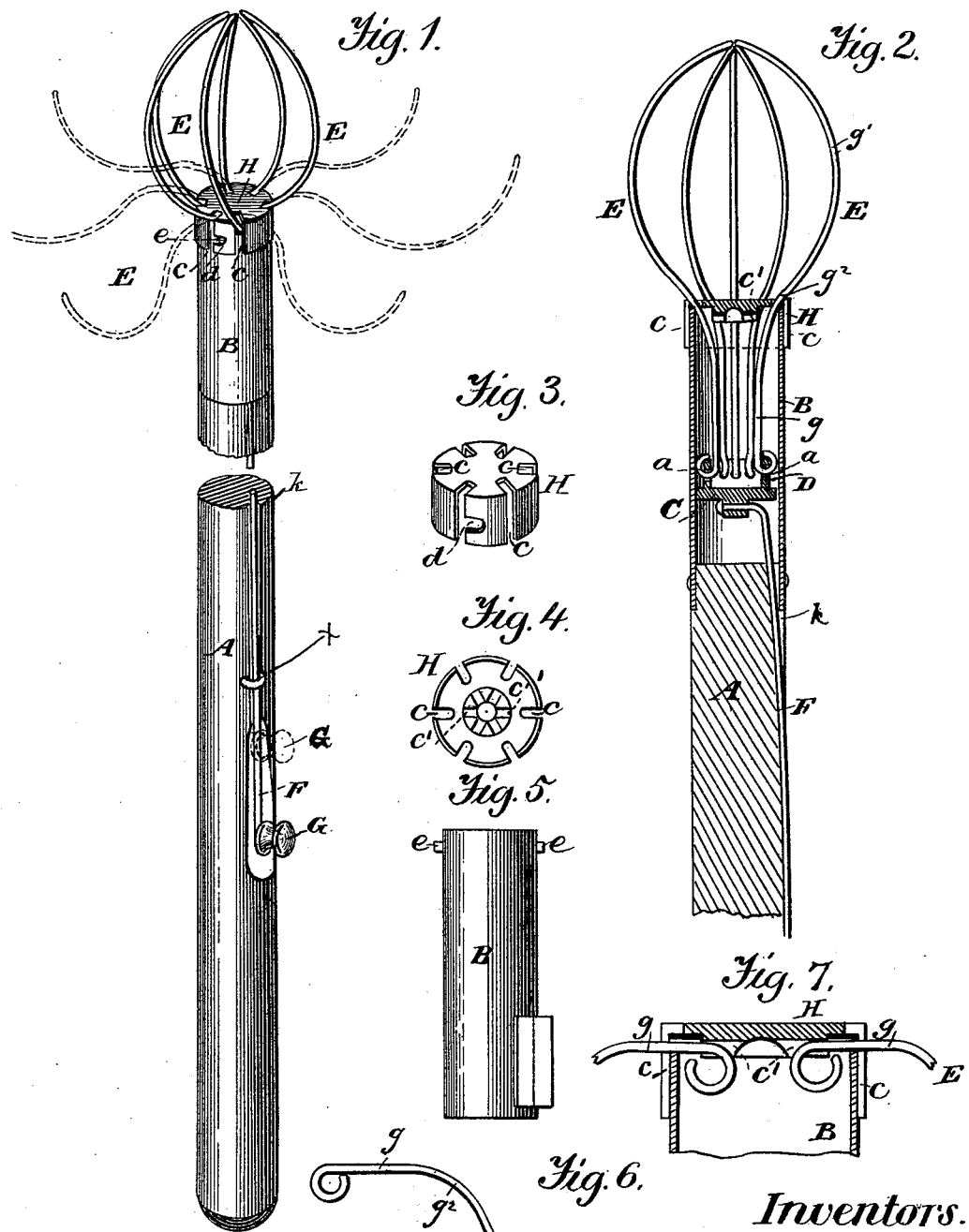

FRANK ANSLEY AND GEORGE W. ANSLEY, OF MEDICAL LAKE, WASHINGTON TERRITORY.

FRUIT-PICKER.

SPECIFICATION forming part of Letters Patent No. 394,550, dated December 18, 1888.

Application filed May 7, 1888. Serial No. 273,051. (No model.)

*To all whom it may concern:*

Be it known that we, FRANK ANSLEY and GEORGE W. ANSLEY, citizens of the United States, residing at Medical Lake, in the county of Spokane, Washington Territory, have invented certain new and useful Improvements in Fruit-Pickers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in devices for gathering fruit; and it has for its object to provide a simple and efficient device adapted for use in picking fruit from trees without bruising or otherwise injuring the same.

To these ends, and to such others as the invention may pertain, the same consists in the peculiar combinations and in the novel construction, arrangement, and adaptation of parts, all as more fully hereinafter described, shown in the accompanying drawings, and then specifically defined in the claims.

The invention is clearly illustrated in the accompanying drawings, which, with the letters of reference marked thereon, form a part of this specification, and in which—

Figure 1 is a perspective view of a fruit-picker constructed in accordance with our invention, the fingers or prongs being shown as closed, and the position occupied by the operating parts when the fingers are opened or extended are indicated by dotted lines. Fig. 2 is a longitudinal section through the device. Fig. 3 is a detail perspective view of the cap. Fig. 4 is a bottom plan of the same, and Figs. 5 and 6 are details more particularly hereinafter referred to. Fig. 7 is a sectional detail, upon an enlarged scale, showing the fingers retained by the notches in the under side of the top of the cap.

Reference now being had to the details of the drawings by letter, A represents a pole or shaft, which may be of any suitable or desired length.

B is a hollow cylinder or ferrule secured at one end of the pole and extended a short distance beyond the end of the same.

C is a metallic head fitted loosely within the ferrule B and adapted to be moved freely within the same. The upper face of the head C is provided with an annular collar or raised portion, D.

E E are fingers or prongs, made, preferably, of wire, and are loosely hinged at their lower ends in any suitable way to the collar D. A very convenient and serviceable manner of forming this hinged connection with the collar we have shown in the drawings, in which we have shown the lower ends of the wires as inside of the collar and passed through suitable holes, $a$, formed at intervals in the sides of the collar, and then bending the end of the wire around the upper edge of the collar, as shown, to form a loose hinge.

The shape or contour of the fingers E is important, and it is clearly shown in Fig. 6 of the drawings. From their points of connection with the collar the fingers extend in substantially a straight line for a short distance, and from this point they curve outwardly in the form of an arc of a circle, so that when closed or drawn together they together form a substantially spherical or elliptical grasping device adapted to receive and surround the fruit to be picked from the tree.

F is a rod or wire, one end of which is passed within the ferrule B, and is there secured to the lower face of the movable head C. From its point of connection with the head B the rod is extended down a suitable groove, $k$, formed upon one side of the pole. Said groove is extended longitudinally along one side of the pole, and staples or keepers, as shown at $x$, may be provided for retaining the rod in position to a point near the base or opposite end of the same, and is provided at its end with a suitable operating-handle, G, by means of which it may be moved longitudinally. The particular form or construction of this handle is unimportant. In the present instance we have shown a knob secured to the lower end of the rod.

H is a cap or cover adapted to be fitted over the end of the ferrule B, and it is provided at intervals around its periphery with radial vertical slots $c$ for the passage of the fingers, and it may also be provided with horizontal slots, as shown at $d$. Said horizontal slots communicate at their entrance with the vertical slots $c$, and when the cap has been placed in position upon the end of the hollow cylinder B the cap is turned slightly, so as to cause the slot $d$ to engage the pin $e$ upon the outer face of the cylinder, thus serving to secure the cap against possible vertical displacement. The notches $c'$ are radial grooves formed in the under side of the top of the cap, and serve, when the fingers are open, to receive the knuckles formed at the base of the fingers at their point of attachment to the collar D, and serve to steady the prongs and secure the same against possible displacement.

From the foregoing description the operation of the device will be readily understood. The rod F is slid or moved upward by means of the operating-handle at its lower end, carrying with it the head C within the ferrule, and the fingers, which are loosely hinged to the collar upon the upper face of the head, are forced out at the end of the ferrule through the radial slots in the cap until the collar reaches the extreme end of the hollow cylinder B, and the fingers being no longer confined within the ferrule their free ends fall outward, and thus open the grasping device. By simply reversing the movement of the operating-handle the head C is again withdrawn into the ferrule and the fingers are closed together, as shown in full lines in Fig. 1 of the drawings.

To more fully understand the operation of the device, it must be remembered that the fingers have their inner ends, $g$, straight, their outer ends, $g'$, approximately semicircular, and the portion $g^2$, between the portions $g$ and $g'$, curved outwardly. The curved portions $g^2$ are in the plane of the cap when the fingers are closed, and are held between the upper edge of the ferrule and the inner or closed ends of the slots $c$ in the cap H. From the foregoing description, reference being had to Fig. 2 of the drawings, it will be seen that an upward movement of the head C will cause a corresponding vertical movement of the fingers which are connected therewith, and that the lower ends of the curved portions $g^2$ of the fingers riding on or bearing against the closed ends of the slots $c$ will effect a spreading or opening of the fingers. When the fingers have opened sufficiently far to bring their center of gravity beyond the sides of the pole A, the fingers will open farther on a continued vertical movement of the head by gravity, and will be supported on the edge of the ferrule. When the head C is moved down, the inner ends of the fingers descend with it, and the fingers, riding on the edge of the ferrule, gradually close. As the ends of the fingers come together, the upper ends of their curved portions $g^2$ bear against the edge of the ferrule, and, on a continued downward movement of the head, effect a positive closing of the ends of the fingers. The outer ends, $g'$, of the fingers are approximately semicircular to adapt them to the globular form of the fruit, which is grasped firmly and securely between them. The inner or lower ends of the fingers are straight, to permit them to close within the ferrule without interfering with one another, and to support the fingers in a nearly-horizontal position when they are opened, substantially as shown by dotted lines in Fig. 1. Once opened, the fingers remain open until the rod F is operated. It will be seen that there are a series of fingers which are disposed in a circle about the edge of the cylinder, each having independent connection with the movable head C. By this construction the fingers will close on all sides of the fruit with an equal pressure, holding it firmly and securely without bruising or injuring it.

Having thus described our invention and set forth its merits, what we claim to be new, and desire to secure by Letters Patent, is—

1. The combination, with the pole, the ferrule, the movable head C, and the fingers loosely connected with the said head, of the cap closing the end of the ferrule and having openings to permit the passage of the fingers, and having notches $c'$ on its inner side, substantially as described, and for the purpose specified.

2. The combination of the pole, the ferrule, the movable head having an annular collar, the fingers having a hinged connection with the head by having their ends passed through openings in the said collar and bent about its edge, and the cap having radial notches $c'$ on its inner side, and having radial openings in its end and vertical slots in its rim, substantially as set forth.

In testimony whereof we affix our signatures in presence of two witnesses.

FRANK ANSLEY.
    GEORGE W. ANSLEY.

Witnesses:
 JOHN TATE,
 JANE TATE.